United States Patent
Yabuki

(10) Patent No.: US 6,359,066 B1
(45) Date of Patent: *Mar. 19, 2002

(54) GOLF BALL

(75) Inventor: Yoshikazu Yabuki, Shirakawa (JP)

(73) Assignee: Sumitomo Rubber Industries, Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/827,459

(22) Filed: Mar. 28, 1997

(30) Foreign Application Priority Data

Mar. 29, 1996 (JP) ............................................. 8-103737
Nov. 8, 1996 (JP) ............................................. 8-312920

(51) Int. Cl.$^7$ ............................................. A63B 37/12
(52) U.S. Cl. ............................. 525/71; 525/89; 525/93; 473/354; 473/365
(58) Field of Search ............................. 525/71, 89, 93; 473/354, 365

(56) References Cited

U.S. PATENT DOCUMENTS

| | | | | |
|---|---|---|---|---|
| 5,693,711 A | * | 12/1997 | Akiba | 525/93 |
| 5,704,852 A | * | 1/1998 | Kato | 473/357 |
| 5,824,740 A | * | 10/1998 | Yabuki | 525/93 |
| 5,848,943 A | * | 12/1998 | Sano | 473/365 |

FOREIGN PATENT DOCUMENTS

| | | | |
|---|---|---|---|
| GB | 2296497 | | 7/1996 |
| JP | 5220240 | | 8/1993 |
| JP | 182777 | * | 7/1996 |

OTHER PUBLICATIONS

Abstract of J08182777.*

* cited by examiner

*Primary Examiner*—David J. Buttner
(74) *Attorney, Agent, or Firm*—Birch, Stewart, Kolasch & Birch, LLP

(57) ABSTRACT

The present invention provides a multi-layer structure golf ball having a thread rubber layer, which has good shot feel and controllability as well as satisfactory flight performance and cut resistance. The golf ball includes a thread wound core and a cover covering the thread wound core, wherein the cover is formed from a heated mixture of:

(A) an ionomer resin, (B) a thermoplastic elastomer having a carboxyl group or a thermoplastic elastomer having a terminal OH group, and (C) a block copolymer having a styrene-butadiene-styrene structure in which the polybutadiene block contains epoxy groups, or a block copolymer having styrene-isoprene-styrene structure in which the polyisoprene block contains epoxy groups, the cover have a flexural modulus of from 50 to 300 MPa and a Shore D-scale hardness of from 40 to 60.

7 Claims, 1 Drawing Sheet

GOLF BALL

FIELD OF THE INVENTION

The present invention relates to a golf ball. More particularly, it relates to a multi-layer structure golf ball having a thread rubber layer, which has good shot feel (feeling at the time of hitting) and controllability as well as satisfactory flight performance and cut resistance.

BACKGROUND OF THE INVENTION

Recently, ionomer resin has widely been used for cover material of golf balls (e.g. Japanese Patent Publication No. 49-27093 etc.). This is because the ionomer resin is superior in durability, cut resistance, rebound performance, etc. and it is easily processed.

However, since the ionomer resin has high hardness and rigidity, the resulting golf ball is poor in shot feel and controllability (ease of giving spin) in comparison with balata (transpolyisoprene) which has been used as cover material of a multi-layer structure golf ball containing a thread rubber layer.

In order to improve shot feel and controllability of the ionomer-covered golf balls, softening the ionomer resin has been intensively studied.

For example, Japanese Patent Laid-Open Publication Nos. 1-308577 and 5-3931 suggest to blend or mix a hard ionomer resin with a soft ionomer resin prepared by neutralizing a terpolymer of α-olefin, an unsaturated carboxylic acid (e.g. acrylic acid, methacrylic acid, etc.) and an acrylate with sodium or zinc ion, thereby improving shot feel and controllability.

However, the blending of the soft ionomer resin as suggested by the above mentioned publications has not provided with the shot feel which is closed to the balata covered golf ball. Instead, the rebound performance and flight performance are adversely lowered by blending the soft ionomer resin and, therefore, sufficient technical effects have not been obtained.

Japanese Patent Laid-Open Publication No. 5-220240 suggests to improve shot feel and controllability by blending the ionomer resin with a polymer containing glycidyl groups. According to this method, shot feel and controllability are slightly improved but they are not sufficient and ionomer-covered gold balls having sufficient characteristics (particularly, rebound performance, flight performance, etc.) are still desired.

OBJECTS OF THE INVENTION

Under these circumstances, the present inventors have intensively studied cover properties to achieve excellent shot feel and controllability, which are close to those of the balata-covered golf balls, and excellent flight performance and cut resistance based on the ionomer resin.

A main object of the present invention is to provide a golf ball having good shot feel and controllability as well as satisfactory flight performance and cut resistance.

This object as well as other objects and advantages of the present invention will become apparent to those skilled in the art from the following description with reference to the accompanying drawings.

SUMMARY OF THE INVENTION

Figure 1:
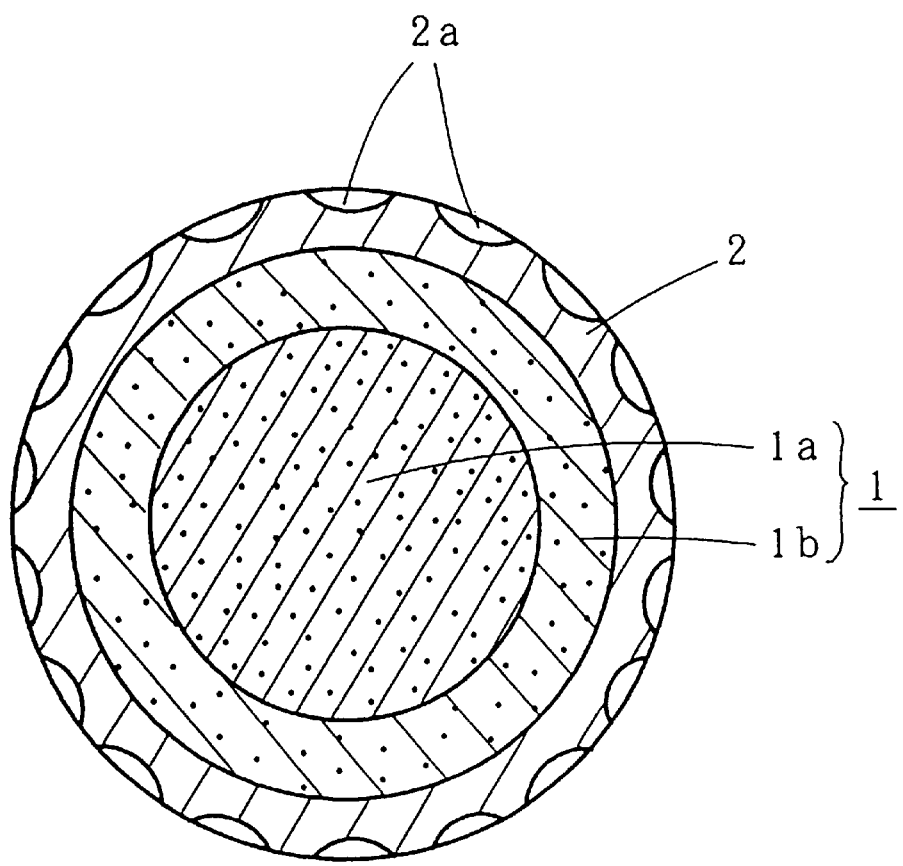
FIG. 1 is a schematic cross section illustrating one embodiment of the golf ball of the present invention.

The present invention provides a golf ball comprising a thread wound core and a cover covering the thread wound core, wherein the cover is formed from a heated mixture of:

(A) an ionomer resin, (B) a thermoplastic elastomer having a carboxyl group or a thermoplastic elastomer having a terminal OH group, and (C) a block copolymer having a styrene-butadiene-styrene structure in which the polybutadiene block contains epoxy groups, or a block copolymer having styrene-isoprene-styrene structure in which the polyisoprene block contains epoxy groups, and the cover has a flexural modulus of from 50 to 300 MPa and a Shore D-scale hardness of from 40 to 60.

DETAILED DESCRIPTION OF THE INVENTION

Hereinafter, the present invention will be explained in detail. In the explanation below, the ionomer resin is referred to as a "component (A)" and the thermoplastic elastomer having a carboxyl group or the thermoplastic elastomer having a terminal OH group is referred to as a "component (B)" and, further, the block copolymer having a styrene-butadiene-styrene structure in which the polybutadiene block contains epoxy groups, or the block copolymer having styrene-isoprene-styrene structure in which the polyisoprene block contains epoxy groups is referred to as a "component (C)". Particularly, the component (C) is abbreviated as "SBS structure block copolymer" or "SIS structure block copolymer".

In the present invention, the thermoplastic elastomer having a carboxyl group or thermoplastic elastomer having a terminal OH group, which is the component (B), is added to the ionomer resin of the component (A), as a soft component. Therefore, the ionomer resin is softened, thereby improving shot feel and controllability. Besides, the SBS structure soft block copolymer having a polybutadiene block containing epoxy groups or SIS structure block soft copolymer having a polyisoprene block containing epoxy groups as the component (C) is added to the ionomer resin of the component (A) and thermoplastic elastomer having a carboxyl group or thermoplastic elastomer having a terminal OH group, as the component (B), followed by mixing with heating. Therefore, the epoxy groups of the epoxy group-containing block copolymer as the component (C) react with free carboxyl groups in the ionomer resin of the component (A) and a carboxylic acid in the thermoplastic elastomer. having a carboxyl group or an —OH group in the thermoplastic elastomer having a terminal OH group, as the component (B), at the time of mixing with heating, thereby accomplishing uniform fine dispersion of the thermoplastic elastomer having a carboxyl group or thermoplastic elastomer having a terminal OH group, as the soft component into the ionomer resin, and improvement in rebound performance of the thermoplastic elastomer having a carboxyl group or thermoplastic elastomer having a terminal OH group. Therefore, deterioration of excellent flight performance (rebound performance) and cut resistance of the ionomer resin is inhibited, thereby making it possible to obtain a solid golf ball having good shot feel and controllability as well as satisfactory flight performance, cut resistance and durability.

(Component (A))

In the present invention, examples of the ionomer resin as the component (A) are one obtained by neutralizing at least a portion of carboxylic groups in a copolymer of an α-olefin and an α,β-unsaturated carboxylic acid having 3 to 8 carbon atoms with metal ion; and one obtained by neutralizing at least a portion of carboxylic groups in a terpolymer of an α-olefin, an α,β-unsaturated carboxylic acid having 3 to 8 carbon atoms and an α,β-unsaturated carboxylate having 2 to 22 carbon atoms with metal ion. Regarding the compositional ratio of the monomers, when a backbone of the ionomer resin is a copolymer of an α-olefin and an α,β-unsaturated carboxylic acid having 3 to 8 carbon atoms, the amount of the α-olefin is preferably from 80 to 90% by weight and the amount of the α,β-unsaturated carboxylic acid having 3 to 8 carbon atoms is preferably from 10 to 20% by weight. When the backbone is a terpolymer of an α-olefin, an α,β-unsaturated carboxylic acid having 3 to 8 carbon atoms and an α,β-unsaturated carboxylate having 2 to 22 carbon atoms, the amount of the α-olefin is from 70 to 85% by weight, the amount of the α,β-unsaturated carboxylic acid having 3 to 8 carbon atoms is preferably from 5 to 20% by weight and, further the amount of the α,β-unsaturated carboxylate having 2 to 22 carbon atoms is preferably from 10 to 25% by weight. It is preferred that the ionomer resin has a melt index (MI) of 0.1 to 20, particularly 0.5 to 15.

The α-olefin listed above can be ethylene, propylene, 1-butene, 1-pentene and the like. Particularly, ethylene is preferred. The α,β-unsaturated carboxylic acid having 3 to 8 carbon atoms may be acrylic acid, methacrylic acid, fumaric acid, maleic acid, crotonic acid and the like. Particularly, acrylate and methacrylate are preferred. Examples of the unsaturated carboxylate are methyl, ethyl, propyl, n-butyl and isobutyl ester of acrylic acid, methacrylic acid, fumaric acid and maleic acid. Particularly, acrylate and methacrylate are preferred. Examples of the metal ion which neutralizes at least a portion of carboxylic groups in the copolymer of the α-olefin and α,β-unsaturated carboxylic acid having 3 to 8 carbon atoms or in the terpolymer of the α-olefin, α,β-unsaturated carboxylic acid having 3 to 8 carbon atoms and α,β-unsaturated carboxylate having 2 to 22 carbon atoms are monovalent metal ions or divalent metal ions, such as sodium ion, lithium ion, zinc ion, magnesium ion, potassium ion and the like.

Specific examples of the above isonomer resins will be indicated by the trade name thereof. Examples of the ionomer resins which are commercially available from Mitsui Du Pont Polychemical Co., Ltd. include Hi-milan 1605 (Na), Hi-milan 1707 (Na), Hi-milan AM7318 (Na), Hi-milan 1706 (Zn), Hi-milan AM7315 (Zn), Hi-milan AM7317 (Zn), Hi-milan AM7311 (Mg) and Hi-milan MK7320 (K); and Hi-milan 1856 (Na), Hi-milan 1855 (Zn) and Hi-milan AM7316 (Zn) as the terpolymer ionomer resin. Examples of the ionomer resins which are commercially available from Du Pont U.S.A. Co. include Surlyn 8920 (Na), Surlyn 8940 (Na), Surlyn AD8512 (Na), Surlyn 9910 (Zn), Surlyn AD8511 (Zn), Surlyn 7930 (Li) and Surlyn 7940 (Li); and Surlyn AD8265 (Na) and Surlyn AD8269 (Na) as the terpolymer ionomer resin. Examples of the ionomer resins which are commercially available from Exxon Chemical Co. include Iotek 7010 (Zn) and Iotek 8000 (Na). Na, Zn, K, Li and Mg, which are described in parentheses after the trade name of the above ionomer resin, indicate their neutralizing metal ion species. In the present invention, two or more ionomer resins described above may be used in combination. Alternatively, two or more ionomer resins neutralized with monovalent metal ion and ionomer resins neutralized with divalent metal ion may be used in combination.

(Component (B))

Examples of the thermoplastic elastomer having a carboxyl group of the component (B) are a maleic anhydride-modified thermoplastic elastomer; a terpolymer of ethylene, an unsaturated carboxylate and an unsaturated carboxylic acid; and the like. Examples of the thermoplastic elastomer having a terminal OH group are a block copolymer having a SEBS structure and a block copolymer having a SEPS structure. The SEBS structure is a structure in which the double bonds of the butadiene block in a styrene-butadiene-styrene block copolymer are hydrogenated and SEPS structure is a structure in which the double bonds of the isoprene block in a styrene-isoprene-styrene block copolymer are hydrogenated.

Examples of the maleic anhydride-modified thermoplastic elastomer are various-grade maleic anhydride adducts of hydrogenated styrene-butadiene-styrene block copolymers, which are commercially available from Asahi Chemical Industry Co., Ltd. under the trade name of "Taftek M series"; various-grade ethylene-ethyl acrylate-maleic anhydride terpolymers, which are commercially available from Sumitomo Chemical Industries Co., Ltd. under the trade name of "Bondine"; various-grade products obtained by graft-modifying ethylene-ethyl acrylate copolymers with maleic anhydride, which are commercially available from Mitsui Du Pont Polychemical Co., Ltd. under the trade name of "AR series"; and various-grade maleic anhydride-modified block polymers wherein a hard segment is a crystalline polyolefin and a soft segment is an amorphous polyolefin, which are commercially available from Kuraray Co., Ltd. under the trade name of "XE-1403".

Examples of the terpolymer of ethylene, unsaturated carboxylate and unsaturated carboxylic acid include ethylene-isobutyl acrylate-methacrylic acid terpolymers, which are commercially available from Mitsui Du Pont Polychemical Co., Ltd. under the trade name of "Neucrel AN4212C", "Neucrel N0805J" and the like.

Examples of the commercially available block copolymers having the SEBS structure or SEPS structure, wherein an OH group is added at a terminal end, include a hydrogenated ethylene-isoprene-styrene block copolymer wherein an —OH group is added at the terminal end, which is commercially available from Kuraray Co., Ltd. under the trade name of "HG-252".

The thermoplastic elastomer having a carboxyl group or thermoplastic elastomer having a terminal OH group of the component (B) is used for the purpose of softening the ionomer resin of the component (A) and preferably has a JIS-A hardness of 30 to 90 or a Shore D-scale hardness of 5 to 40, in order to adjust the flexural modulus and Shore D-scale hardness of the cover composition for the cover to 50–300 Mpa and 40–60. When the JIS-A hardness of the thermoplastic elastomer having a carboxyl group or thermoplastic elastomer having a terminal OH group is smaller than 30 or the Shore D-scale hardness thereof is smaller than 5, the cover is too soft and cut resistance is poor. On the other hand, when the JIS-A hardness is larger than 90 or the Shore D-scale hardness is larger than 40, softening of the ionomer resin (A) can not be sufficiently accomplished and it is difficult to sufficiently improve shot feel and controllability. It is particularly preferred that the JIS-A hardness is from 40 to 88 or the Shore D-scale hardness is from 10 to 40. The JIS-A hardness is a hardness measured by a JIS-A hardness tester according to JIS K-6301, and the Shore D-scale hardness is a hardness measured by a Shore D-scale hardness tester according to ASTM D-2240.

(Component (C))

In the present invention, the SBS structure block copolymer having a polybutadiene block containing epoxy groups is a block copolymer having polystyrene blocks at both terminal ends, wherein the intermediate layer is polybutadiene block containing epoxy groups and abbreviated to "SBS" and a portion or all of double bonds of the polybutadiene moiety is hydrogenated. The SBS structure block copolymer having a polyisoprene block containing epoxy groups is a block copolymer having polystyrene blocks at both terminal ends, wherein the intermediate layer is polyisoprene block containing epoxy groups and abbreviated to "SIS" and a portion or all of double bonds of the polyisoprene moiety is hydrogenated. The styrene content of the SBS structure or SIS structure block copolymer of the component (C) is preferably from 10 to 50% by weight, particularly from 15 to 45% by weight. When the styrene content is less than 10% by weight, the cover is too soft and cut resistance is lowered. On the other hand, when the styrene content is larger than 50% by weight, softening of the ionomer resin is not sufficiently accomplished and the properties of the ionomer resin appear strongly and shot feel and controllability are poor.

The epoxy content of the SBS structure or SIS structure block copolymer of the component (C) is preferably from 0.05 to 10% by weight, particularly from 0.2 to 5% by weight. When the epoxy content is less than 0.05% by weight, the amount of reaction of the epoxy group is small and the dispersion of the thermoplastic elastomer having a carboxyl group or thermoplastic elastomer having a terminal OH group of the component (B) or the SBS structure or SIS structure block copolymer of the component (C) into the ionomer resin of the component (A) is deteriorated and, therefore, durability is poor. On the other hand, when the epoxy content is larger than 10% by weight, the amount of reaction of the epoxy group and free carboxyl groups is too much and its fluidity is poor and therefore, molding of the golf ball is difficult.

Since the component (C) also has a function of softening the ionomer resin of the component (A) similar to the component (B), it is preferred that the SBS structure or SIS structure block copolymer of the component (C) has a JIS-A hardness of 30–90, particularly, 40–88. When the JIS-A hardness of the SBS structure or SIS structure block copolymer of the component (C) is smaller than 30, the cover is too soft and cut resistance is lowered. On the other hand, when the JIS-A hardness is larger than 90, softening of the ionomer resin is not sufficiently accomplished and the properties of the ionomer resin appear strongly and, therefore, shot feel and controllability are poor.

Examples of the thermoplastic elastomer having a carboxyl group of the component (B) are a maleic anhydride-modified thermoplastic elastomer; a terpolymer of ethylene, an unsaturated carboxylate and an unsaturated carboxylic acid; and the like. Examples of the thermoplastic elastomer having a terminal OH group are a block copolymer having a SEBS structure and a block copolymer having a SEPS structure. The SEBS structure is a structure in which the double bonds of the butadiene block in a styrene-butadiene-styrene block copolymer has some of the unsaturated bonds in the butadiene block epoxidized and the other unsaturated bonds in the butadiene block are hydrogenated and SEPS structure is a structure in which the double bonds of the isoprene block in a styrene-isoprene-styrene block copolymer has some of the unsaturated bonds in the polyisoprene block epoxidized and the other unsaturated bonds in the polyisoprene block are hydrogenated.

(The other features)

In the present invention, it is necessary that the cover is mainly composed of the ionomer resin of the component (A), the thermoplastic elastomer having a carboxyl group or thermoplastic elastomer having a terminal OH group of the component (B) and the SBS structure or SIS structure block copolymer of the component (C) and the cover composition containing them has a flexural modulus of 50 to 300 MPa and a Shore D-scale hardness of 40 to 60. When the flexural modulus of the cover composition is smaller than 50 MPa, the cover is too soft and spin amount increases too much. Therefore, flight distance is lowered and cut resistance is lowered. On the other hand, when the flexural modulus is larger than 300 MPa, it is impossible to obtain the suitable backspin amount. Therefore, controllability is poor and shot feel is poor.

When the Shore D-scale hardness of the cover composition is smaller than 40, the cover is too soft and cut resistance is poor. On the other hand, when the Shore D-scale hardness is larger than 60, it is impossible to obtain the suitable backspin amount. Therefore, controllability is poor and shot feel is also poor.

Regarding the cover composition, a heated mixture of the ionomer resin of the component (A), the thermoplastic elastomer having a carboxyl group or thermoplastic elastomer having a terminal OH group of the component (B) and the SBS structure or SIS structure block copolymer of the component (C) occupies a main part and, in the majority of case, a small amount of titanium dioxide and barium sulfate is merely added. Therefore, the flexural modulus and Shore D-scale hardness are substantially the same as that of the heated mixture of the ionomer resin of the component (A), the thermoplastic elastomer having a carboxyl group or thermoplastic elastomer having a terminal OH group of the component (B) and the SBS structure or SIS structure block copolymer of the component (C).

In the present invention, in case of mixing the ionomer resin of the component (A), the thermoplastic elastomer having a carboxyl group or thermoplastic elastomer having a terminal OH group of the component (B) and the SBS structure or SIS structure block copolymer of the component (C), the amount of the ionomer resin of the component (A) is preferably from 30 to 90% by weight, that of the thermoplastic elastomer having a carboxyl group or thermoplastic elastomer having a terminal OH group of the component (B) is preferably from 1 to 49% by weight and that of SBS structure or SIS structure block copolymer of the component (C) is preferably from 1 to 49% by weight. When the amount of the ionomer resin of the component (A) is larger than the above range, softening of the ionomer resin is not sufficiently accomplished and the properties of the ionomer resin appear strongly and, therefore, shot feel and controllability are poor. On the other hand, when the amount of the ionomer resin of the component (A) is smaller than the above range, the cover is too soft and spin amount increases too much. Therefore, flight distance and cut resistance are poor. When the amount of the thermoplastic elastomer having a carboxyl group or thermoplastic elastomer having a terminal OH group of the component (B) is smaller than the above range, softening of the ionomer resin is not sufficiently accomplished, and it is difficult to sufficiently improve shot feel and controllability. On the other hand, when the amount of the thermoplastic elastomer having a carboxyl group or thermoplastic elastomer having a terminal OH group of the component (B) is larger than the above range, the cover is too soft and cut resistance is poor. When the amount of the SBS structure or SIS structure block copolymer of the component (C) is smaller than the above range, softening of the ionomer resin is not sufficiently accomplished, and it is difficult to sufficiently improve shot feel and controllability. On the other hand, when the SBS structure or SIS structure block copolymer of the component (C) is larger than the above range, the epoxy content is large and the reaction amount with the ionomer resin of the component (A) and thermoplastic elastomer having a carboxyl group or thermoplastic elastomer having a terminal OH group of the component (B) is too large and fluidity is poor and therefore, molding of the golf ball is difficult.

In the present invention, it is possible to obtain desired characteristics by mixing the ionomer resin of the component (A), the thermoplastic elastomer having a carboxyl group or thermoplastic elastomer having a terminal OH group of the component (B) and the SBS w structure or SIS structure block copolymer of the component (C) with heating. They are generally mixed at a temperature of 150 to 260° C., using internal mixers such as a kneading type twin-screw extruder, a Banbury, a kneader, etc.

If necessary, various additives such as pigments, dispersants, antioxidants, UV absorbers, photostabilizers, etc. can be formulated in the cover composition, in addition to the heated mixture of the ionomer resin of the component (A), the thermoplastic elastomer having a carboxyl group or thermoplastic elastomer having a terminal OH group of the component (B) and the SBS structure or SIS structure block copolymer of the component (C). The other resin can also be added within the range as long as the characteristics of the component (A), thermoplastic elastomer having a carboxyl group or thermoplastic elastomer having a terminal OH group of the component (B) and SBS structure or SIS structure block copolymer of the component (C) are not damaged. When the other resin is added to form a cover composition, the amount of the heated mixture of ionomer resin of the component (A), the thermoplastic elastomer having a carboxyl group or thermoplastic elastomer having a terminal OH group of the component (B) and the SBS structure or SIS structure block copolymer of the component (C) is preferably not less than 70% by weight, particularly not less than 80% by weight. In the present invention, "the heated mixture of the ionomer resin of the component (A), the thermoplastic elastomer having a carboxyl group or thermoplastic elastomer having a terminal OH group of the component (B) and the SBS structure or SIS structure block copolymer of the component (C) is used as the main component of the cover" means not only that the cover is mainly composed of the heated mixture of the ionomer resin of the component (A), thermoplastic elastomer having a carboxyl group or thermoplastic elastomer having a terminal OH group of the component (B) and SBS structure or SIS structure block copolymer of the component (C), but also that the other resin is added to the heated mixture to form the cover. In the present invention, the heated mixture of the ionomer resin of the component (A), thermoplastic elastomer having a carboxyl group or thermoplastic elastomer having a terminal OH group of the component (B) and SBS structure or SIS structure block copolymer of the component (C) may be previously mixed with heating, followed by mixing with the other resin. In addition, the mixture may be mixed with the other additives when the cover composition is prepared.

(thread wound core)

The thread wound core is composed of a center and a thread rubber layer formed by winding a thread rubber in a stretched state around the center. The center may be a solid center of a vulcanized molded article of the rubber composition or a liquid center produced by encapsulating a liquid such as water, paste, etc. into a center cover of a vulcanized rubber. The solid center preferably has a diameter of from 28 to 38 mm and a deformation amount of 0.5 to 2.5 mm when applying a weight from an initial load of 10 Kg to a final load of 30 Kg. When the diameter of the solid center is smaller than 28 mm, launch angle is small and spin amount is increased. Therefore, flight distance is poor. On the other hand, when the diameter of the solid center is larger than 38 mm, winding of a thread rubber is finished before a suitable tension is applied to the thread rubber when winding the thread rubber around the solid center. Therefore, the rebound force of the thread rubber layer is not sufficiently utilized and the rebound performance of the golf ball is poor and flight distance is also poor. When the deformation amount is less than 0.5 mm, the center is too hard and the resulting golf ball has very poor shot feel. If the deformation amount is more than 2.5 mm, the center is too soft and it is difficult to control to a suitable ball hardness, thus degrading initial velocity of the resulting golf ball. In case of the liquid center, a diameter is preferably from 26 to 34 mm. When the diameter of the liquid center is smaller than 26 mm, the launch angle is small and amount of spin increases. Therefore, it is difficult to attain a long flight distance. On the other hand, when the diameter of the liquid center is larger than 34 mm, the desired ball hardness is not obtained and the thread rubber layer is thin. Therefore, the rebound performance of the golf ball is lowered and it is difficult to attain a long flight distance.

The thread rubber can be the same one which has hitherto been used. For example, it can be one obtained by vulcanizing a rubber composition prepared by mixing antioxidants, vulcanization accelerators, sulfur, etc. with a natural rubber or a blend rubber of the natural rubber and synthetic polyisoprene.

A method of covering the cover on the core is not specifically limited, but may be a conventional method. For example, there can be used a method comprising molding a cover composition containing a heated mixture of the ionomer resin of the component (A), thermoplastic elastomer having a carboxyl group or thermoplastic elastomer having a terminal OH group of the component (B) and SBS structure or SIS structure block copolymer of the component (C) into a semi-spherical half-shell, covering a thread wound core with two half-shells and then subjecting to a pressure molding at 130 to 170° C. for 1 to 5 minutes, or a method comprising injection molding the cover composition directly on the thread wound core to cover the core. The thickness of the cover is generally about from 1 to 4 mm. In case of cover molding, dimples may be formed on the surface of the ball, if necessary. Further, if necessary, painting or marking may be provided after cover molding.

FIG. 1 is a schematic cross section illustrating one embodiment of the golf ball of the present invention. In FIG. 1, 1 is a thread wound core composed of a center 1a and a thread rubber layer 1b, 2 is a cover and 2a represents dimples. The center 1a may be any one of solid and liquid centers, and the cover 2 for coating the center is formed by a composition for cover having a flexural modulus of 50 to 300 MPa and a Shore D-scale hardness of 40 to 60, which contains the heated mixture of the ionomer resin as the component (A), acid-modified thermoplastic elastomer or thermoplastic elastomer in which an —OH group is added at the terminal end as the component (B) and SBS structure or SIS structure block copolymer as the component (C).

A suitable number/embodiment of dimples 2a are optionally provided on the cover 2 of the golf ball so that desired characteristics may be obtained. In addition, painting or marking is optionally provided on the surface of the golf ball.

As described above, according to the present invention, there could be provided a multi-layer structure golf ball having a thread rubber layer, which has good shot feel and controllability as well as satisfactory flight performance and cut resistance and excellent durability.

EXAMPLES

The following Examples and Comparative Examples further illustrate the present invention in detail but are not to be construed to limit the scope thereof.

Examples 1 to 22 and Comparative Examples 1 to 8

Golf balls of Examples 1 to 22 and Comparative Examples 1 to 8 were produced through the following processes (1) to (3).
(1) Production of thread wound core
(1)-a Production of solid center After a rubber composition having the composition shown in Table 1 was prepared, the rubber composition was charged in a mold and subjected to vulcanization molding at 165° C. for 20 minutes to obtain a solid center. An amount of the respective components formulated in Table 1 is represented by parts by weight. Polybutadiene used was BR-11 (trade name) manufactured by Japan Synthetic Rubber Co., Ltd. An antioxidant is Yoshinox 425 (trade name) manufactured by Yoshitomi Pharmaceutical Industries, Ltd. The weight and diameter of the resulting solid center are shown in Table 1.

TABLE 1

|  | a | b | c |
|---|---|---|---|
| Composition of solid center: | | | |
| Polybutadiene | 100 | 100 | 100 |
| Zinc acrylate | 8 | 15 | 30 |
| Dicumyl peroxide | 1.5 | 1.5 | 1.5 |
| Zinc oxide | 15 | 15 | 15 |
| Barium sulfate | 67 | 41 | 18 |
| Antioxidant | 0.5 | 0.5 | 0.5 |
| Physical properties of solid center: | | | |
| Weight (g) | 20.7 | 26.9 | 30.2 |
| Diameter (mm) | 30.0 | 34.0 | 36.0 |
| Deformation amount (mm) | 2.3 | 1.5 | 0.7 |

(1)-b Production of liquid center

Using a rubber composition for center cover having the composition shown in Table 2 and a paste, a liquid center was produced. An amount of the respective components formulated in Table 2 is represented by parts by weight.

In the production of the liquid center, the paste shown in Table 2 was firstly poured into a mold cooled by a refrigerant carrier and frozen to produce a spherical core having a diameter of 24.5 mm.

Then, a rubber composition for center cover having the composition shown in Table 2 was molded into a sheet and the above frozen spherical core was covered with the sheet. After punching, the resultant was put in a mold and subjected to vulcanization molding at 155° C. for 30 minutes to produce a liquid center having a diameter of 28.1 mm. The weight and diameter of the resulting liquid center are shown in Table 2.

TABLE 2

| Composition of center cover: | |
|---|---|
| Natural rubber | 100 |
| Zinc oxide | 5 |
| Sulfur | 2 |
| Vulcanization accelerator (CZ) | 2 |
| Calcium carbonate | 56 |
| Composition for paste: | |
| Water | 88 |
| Glycerine | 12 |
| Clay | 20 |
| Barium sulfate | 114 |
| Physical properties of liquid center: | |
| Weight (g) | 18.5 |
| Diameter (mm) | 28.1 |

Then, a thread rubber layer was formed by winding a thread rubber made of a blend rubber, wherein a base rubber was a natural rubber/low-cis isoprene rubber (weight ratio: 30:70) [Shell IR-309 (trade name), manufactured by Shell Chemical Co.] in a stretched state around the above each center, thereby producing a thread wound core having an outer diameter of about 39 mm. When using the liquid center as the center, the liquid center was frozen in case of winding the thread rubber.

The resulting thread wound core using the solid center was used for producing golf balls of Examples 1 to 12 and Comparative Examples 1 to 4, and the thread core using the liquid center was used for producing golf balls of Examples 13 to 22 and Comparative Examples 5 to 8.
(2) Production of composition for cover The formulation materials shown in Table 3 to Table 5 were mixed using a kneading type twin-screw extruder to obtain a pelletized cover compositions. The formulation amount described in Table 3 to Table 5 is represented by parts by weight. With respect to those represented by the trade name in Table 3 to Table 5, the details will be explained at the back of Table 5.

The extrusion conditions were as follows: a screw diameter: 45 mm; a screw revolution per minute: 200 rpm; a screw L/D: 35. The formulation materials were heated to 220–260° C. at the die position of the extruder. Then, the flexural modulus and Shore D-scale hardness of the resulting cover composition were measured. The flexural modulus was measured according to ASTM D-747 after a sheet having a thickness of about 2 mm obtained by heat-press molding was preserved at 23° C. for two weeks. The Shore D-scale hardness was measured according to ASTM D-2240 after a sheet having a thickness of about 2 mm obtained by heat-press molding was preserved at 23° C. for two weeks. These results are shown in Table 3 to Table 5, together with the composition of the cover composition. The cover compositions A to J whose composition is shown in Table 3 to Table 4 were used for the golf balls of the Examples, and the cover compositions K to N whose composition is shown in Table 5 were used for the golf balls of the Comparative Examples.

TABLE 3

| | | Cover composition | | | | |
|---|---|---|---|---|---|---|
| | | A | B | C | D | E |
| Hi-milan 1605 | *1 | 35 | 25 | C | 0 | 25 |
| Hi-milan 1706 | *2 | 35 | 25 | 0 | 0 | 25 |
| Hi-milan 1855 | *3 | 0 | 25 | 36 | 0 | 25 |
| Surlyn AD8511 | *4 | 0 | 0 | 24 | 30 | 0 |

TABLE 3-continued

| | | Cover composition | | | | |
|---|---|---|---|---|---|---|
| | | A | B | C | D | E |
| Surlyn AD8512 | *5 | 0 | 0 | 24 | 30 | 0 |
| Neucrel AN4212C | *6 | 25 | 0 | 0 | 0 | 0 |
| Neucrel AN0825J | *7 | 0 | 15 | 0 | 0 | 15 |
| AR-201 | *8 | 0 | 0 | 8 | 0 | 0 |
| Bondine AX8390 | *9 | 0 | 0 | 0 | 25 | 0 |
| ESBS A1005 | *10 | 5 | 0 | 0 | 0 | 0 |
| ESBS A1010 | *11 | 0 | 10 | 0 | 0 | 0 |
| ESBS AT018 | *12 | 0 | 0 | 8 | 0 | 0 |
| ESBS AT019 | *13 | 0 | 0 | 0 | 15 | 0 |
| ESBS A1020 | *14 | 0 | 0 | 0 | 0 | 10 |
| Titanium dioxide | | 2 | 2 | 2 | 2 | 2 |
| Barium sulfate | | 2 | 2 | 2 | 2 | 2 |
| Flexural modulus (Mpa) | | 220 | 160 | 170 | 130 | 150 |
| Shore D-scale hardness | | 54 | 54 | 56 | 47 | 53 |

TABLE 4

| | | Cover composition | | | | |
|---|---|---|---|---|---|---|
| | | F | G | H | I | J |
| Hi-milan 1855 | *3 | 15 | 10 | 0 | 5 | 0 |
| Surlyn AD8511 | *4 | 0 | 0 | 25 | 40 | 30 |
| Surlyn AD8512 | *5 | 32.5 | 35 | 25 | 40 | 30 |
| Hi-milan AM7317 | *15 | 32.5 | 35 | 0 | 0 | 0 |
| AR-201 | *8 | 0 | 0 | 0 | 10 | 0 |
| XE-1403 | *16 | 15 | 0 | 0 | 0 | 0 |
| HG-252 | *17 | 0 | 10 | 35 | 0 | 20 |
| ESBS A1005 | *10 | 5 | 0 | 0 | 5 | 0 |
| ESBS A1010 | *11 | 0 | 10 | 15 | 0 | 0 |
| ESBS A1020 | *14 | 0 | 0 | 0 | 0 | 20 |
| Titanium dioxide | | 2 | 2 | 2 | 2 | 2 |
| Barium sulfate | | 2 | 2 | 2 | 2 | 2 |
| Flexural modulus (MPa) | | 220 | 240 | 80 | 275 | 130 |
| Shore D-scale hardness | | 56 | 57 | 51 | 58 | 50 |

TABLE 5

| | | Cover composition | | | |
|---|---|---|---|---|---|
| | | K | L | M | N |
| Hi-milan 1605 | *1 | 50 | 30 | 15 | 0 |
| Hi-milan 1706 | *2 | 50 | 0 | 15 | 0 |
| Hi-milan 1855 | *3 | 0 | 0 | 70 | 80 |
| Hi-milan AM7317 | *15 | 0 | 30 | 0 | 0 |
| Surlyn AD8269 | *18 | 0 | 40 | 0 | 20 |
| Titanium dioxide | | 2 | 2 | 2 | 2 |
| Barium sulfate | | 2 | 2 | 2 | 2 |
| Flexural modulus (MPa) | | 340 | 200 | 150 | 80 |
| Shore D-scale hardness | | 62 | 58 | 55 | 51 |

1: Hi-milan 1605 (trade name), ethylene-methacrylic acid copolymer ionomer resin obtained by neutralizing with a sodium ion, manufactured by Mitsui Du Pont Polychemical Co., Ltd., MI (melt index): 2.8, flexural modulus: 310 MPa, Shore D-scale hardness: 62

2: Hi-milan 1706 (trade name), ethylene-methacrylic acid copolymer ionomer resin obtained by neutralizing with a zinc ion, manufactured by Mitsui Du Pont Polychemical Co., Ltd., MI: 0.8, flexural modulus: 260 MPa, Shore D-scale hardness: 61

3: Hi-milan 1855 (trade name), ethylene-butyl acrylate-methacrylic acid terpolymer ionomer resin obtained by neutralizing with a zinc ion, manufactured by Mitsui Du Pont Polychemical Co., Ltd., MI: 1.0, flexural modulus: 90 MPa, Shore D-scale hardness: 55

4: Surlyn AD8511 (trade name), ethylene-methacrylic acid copolymer ionomer resin obtained by neutralizing with a zinc ion, manufactured by Du Pont Co., MI: 3.4, flexural modulus: 220 MPa, Shore D-scale hardness: 60

5: Surlyn AD8512 (trade name), ethylene-methacrylic acid copolymer ionomer resin obtained by neutralizing with a sodium ion, manufactured by Du Pont Co., MI: 4.4, flexural modulus: 280 MPa, Shore D-scale hardness: 62

6: Neucrel AN4212C (trade name), ethylene-isobutyl acrylate-methacrylic acid terpolymer resin [polymerization composition ratio: 76/20/4 (weight ratio)], manufactured by Du Pont Co., MI: 12, MPa, Shore D-scale hardness: 30

7: Neucrel AN0825J (trade name), ethylene-isobutyl acrylate-methacrylic acid terpolymer resin [polymerization composition ratio: 72/20/8 (weight ratio)], manufactured by Du Pont Co., MI: 25, MPa, Shore D-scale hardness: 25

8: AR-201 (trade name), product obtained by graft-modifying ethylene-ethyl acrylate copolymer with maleic anhydride, manufactured by Du Pont Co., JIS-A hardness: 51

9: Bondine AX8390 (trade name), ethylene-ethyl acrylate-maleic anhydride terpolymer resin, manufactured by Sumitomo Chemical Industries Co., Ltd., MI: 7.0, MPa, Shore D-scale hardness: 14, content of ethyl acrylate+ maleic anhydride: 32% (content of maleic anhydride: 1–4%)

10: ESBS A1005 (trade name), SBS structure block copolymer having a polybutadiene block containing epoxy groups, manufactured by Daicel Chemical Industries, Ltd., JIS-A hardness: 70, styrene/butadiene (weight ratio: 40/60), content of epoxy: about 0.7–0.9% by weight 11: ESBS A 1010 (trade name), SBS structure block copolymer having a polybutadiene block containing epoxy groups, manufactured by Daicel Chemical Industries, Ltd., JIS-A hardness: 67, styrene/butadiene (weight ratio: 40/60), content of epoxy: about 1.5–1.7% by weight 12: ESBS AT018 (trade name), SBS structure block copolymer prepared by hydrogenating a part of a polybutadiene block containing epoxy groups, manufactured by Daicel Chemical Industries, Ltd., JIS-A hardness: 70, styrene/butadiene (weight ratio: 40/60), content of epoxy: about 0.7–0.9% by weight 13: ESBS AT019 (trade name), SBS structure block copolymer prepared by hydrogenating a polybutadiene block containing epoxy groups, manufactured by Daicel Chemical Industries, Ltd., JIS-A hardness: 67, styrene/butadiene (weight ratio: 40/60), content of epoxy: about 1.5–1.7% by weight 14: ESBS A1020 (trade name), SBS structure block copolymer having a polybutadiene block containing epoxy groups, manufactured by Daicel Chemical Industries, Ltd., JIS-A hardness: 65, styrene/butadiene (weight ratio: 40/60), content of epoxy: about 2.9–3.4% by weight 15: Hi-milan AM7317 (trade name), ethylene-methacrylic acid copolymer ionomer resin obtained by neutralizing with a zinc ion, manufactured by Mitsui Du Pont Polychemical Co., Ltd., MI: 1.2, flexural modulus: 310 MPa, Shore D-scale hardness: 64

16: XE-1403 (trade name), maleic anhydride-modified crystalline thermoplastic elastomer, manufactured by Kuraray Co., Ltd., block polymer wherein hard segment is crystalline polyolefin and soft segment is noncrystalline polyolefin, JIS-A hardness: 60

17: HG-252 (trade name), hydrogenated styrene-isoprene-styrene block copolymer having a terminal OH group, manufactured by Kuraray Co., Ltd., JIS-A hardness: 80, content of styrene: 40% by weight 18: Surlyn AD8269 (trade name), ethylene-butyl acrylate-methacrylic acid terpolymer ionomer resin obtained by neutralizing with a zinc ion, manufactured by Du Pont Co., MI: 1.0, flexural modulus: 26 MPa, Shore D-scale hardness: 36

(3) Production of golf ball

A semi-spherical half-shell was molded from the cover composition of the above item (2) and the thread wound core of the above item (1) was covered with two half-shells, followed by press-molding in a mold for ball at 150° C. for 2 minutes to cover the thread wound core with a cover. Then, a paint was applied on the surface to produce a golf ball having an outer diameter of 42.8 mm. Combinations of the center and cover used in the production of the golf ball are shown in Table 6 to Table 11, together with the ball physical properties described hereinafter.

The ball weight, ball initial velocity, flight distance (carry) and spin amount of the golf ball thus obtained were measured. The ball initial velocity was measured by the R&A initial velocity measuring method. The flight distance was measured by attaching a No. 1 wood club to a swing robot manufactured by True Temper Co. and hitting a golf ball at a head speed of 45 m/second. The spin amount was measured by attaching a No. 9 iron club to the above swing robot manufactured by True Temper Co., hitting a golf ball at a head speed of 34 m/second, and taking a photograph of a mark provided on the hit golf ball using a high-speed camera.

In order to evaluate the cut resistance of the golf balls of Examples 1 to 20 and Comparative Examples 1 to 8, a pitching wedge was attached to a swing robot manufactured by True Temper Co. and the top part of a golf ball was hit at a head speed of 30 m/second, and then it was examined whether a cut mark is formed or not. The evaluation criteria are as follows.

Evaluation criteria

○: A cut mark is not formed.

Δ: Small cut mark is formed.

X: Large cut mark is formed.

In order to evaluate the durability of the above golf balls, a No. 1 wood club was attached to a swing robot manufactured by True Temper Co. and a golf ball was hit at a head speed of 45 m/second, and then the number of times until breakage arises was measured. The resulting value is indicated as an index in case of an impact-resistant number (number of times until breakage arises) of Comparative Example 1 as a criterion for comparison being 100.

The shot feel and controllability of the resulting golf balls were evaluated with 10 top professional golfers according to a practical hitting test. The evaluation criteria are as follows. The results shown in the Tables below are based on the fact that not less than 8 out of 10 professional golfers evaluated with the same criterion about each test item.

Evaluation criteria

○: Shot feel and controllability are similar to those of a golf ball using a balata cover, good.

Δ: Controllability is similar to that of a golf ball using a balata cover, but shot feel is quite different. That is, the golf ball is too hard and, therefore, the impact force is too strong, or the golf ball is too soft, which results in heavy feeling.

X: Both shot feel and controllability are poor.

Measurement results of physical properties of the golf balls of Examples 1 to 12 and Comparative Examples 1 to 4 are shown in Table 6 to Table 8, together with the kind of the center, kind of the cover (composition for cover), flexural modulus and Shore D-scale hardness. Those of the golf balls of Examples 13 to 22 and Comparative Examples 5 to 8 are shown in Table 9 to Table 11.

TABLE 6

| | Example No. | | | | |
|---|---|---|---|---|---|
| | 1 | 2 | 3 | 4 | 5 |
| Center | Solid-b | Solid-b | Solid-b | Solid-b | Solid-b |
| Cover | | | | | |
| Kind | A | B | C | D | E |
| Flexural modulus (MPa) | 220 | 160 | 170 | 130 | 150 |
| Shore D-scale hardness | 54 | 54 | 56 | 47 | 53 |
| Ball physical properties | | | | | |
| Weight (g) | 45.4 | 45.4 | 45.4 | 45.4 | 45.4 |
| Initial velocity (feet/second) | 253.0 | 252.9 | 253.0 | 252.6 | 252.8 |
| Flight distance (yard) | 235 | 234 | 235 | 233 | 233 |
| Spin amount (rpm) | 8460 | 8510 | 8340 | 8610 | 8530 |
| Cut resistance | ○ | ○ | ○ | ○ | ○ |
| Durability (index) | 170 | 170 | 165 | 185 | 175 |
| Shot feel and controllability | ○ | ○ | ○ | ○ | ○ |

TABLE 7

| | Example No. | | | | | | |
|---|---|---|---|---|---|---|---|
| | 6 | 7 | 8 | 9 | 10 | 11 | 12 |
| Center | Solid-b | Solid-b | Solid-b | Solid-b | Solid-b | Solid-a | Solid-b |
| Cover | | | | | | | |
| Kind | F | G | H | I | J | H | H |
| Flexural modulus (MPa) | 220 | 240 | 80 | 275 | 130 | 80 | 80 |
| Shore D-scale hardness | 56 | 57 | 51 | 58 | 50 | 51 | 51 |
| Ball physical properties | | | | | | | |
| Weight (g) | 45.4 | 45.4 | 45.4 | 45.4 | 45.4 | 45.4 | 45.4 |
| Initial velocity (feet/second) | 253.1 | 253.2 | 252.7 | 253.4 | 252.7 | 253.0 | 253.2 |
| Flight distance (yard) | 236 | 236 | 234 | 237 | 233 | 233 | 235 |
| | 8410 | 8360 | 8510 | 8220 | 8540 | 8560 | 8450 |

TABLE 7-continued

| | Example No. | | | | | | |
|---|---|---|---|---|---|---|---|
| | 6 | 7 | 8 | 9 | 10 | 11 | 12 |
| Spin amount (rpm) | | | | | | | |
| Cut resistance | ◯ | ◯ | ◯ | ◯ | ◯ | ◯ | ◯ |
| Durability (index) | 165 | 162 | 178 | 155 | 180 | 182 | 160 |
| Shot feel and controllability | ◯ | ◯ | ◯ | ◯ | ◯ | ◯ | ◯ |

TABLE 8

| | Comparative Example No. | | | |
|---|---|---|---|---|
| | 1 | 2 | 3 | 4 |
| Center Cover | Solid-b | Solid-b | Solid-b | Solid-b |
| Kind | K | L | M | N |
| Flexural modulus (MPa) | 340 | 200 | 150 | 80 |
| Shore D-scale hardness | 62 | 58 | 55 | 51 |
| Ball physical properties | | | | |
| Weight (g) | 45.4 | 45.4 | 45.4 | 45.4 |
| Initial velocity (feet/second) | 253.1 | 251.3 | 251.0 | 248.3 |
| Flight distance (yard) | 234 | 227 | 226 | 218 |
| Spin amount (rpm) | 6810 | 7530 | 7910 | 9520 |
| Cut resistance | ◯ | ◯ | ◯ | X |
| Durability (index) | 100 | 130 | 135 | 85 |
| Shot feel and controllability | X | X | Δ | Δ |

TABLE 9

| | Example No. | | | | |
|---|---|---|---|---|---|
| | 13 | 14 | 15 | 16 | 17 |
| Center Cover | Liquid | Liquid | Liquid | Liquid | Liquid |
| Kind | A | B | C | D | E |
| Flexural modulus (MPa) | 220 | 160 | 170 | 130 | 150 |
| Shore D-scale hardness | 54 | 54 | 56 | 47 | 53 |
| Ball physical properties | | | | | |
| Weight (g) | 45.4 | 45.4 | 45.4 | 45.4 | 45.4 |
| Initial velocity (feet/second) | 252.5 | 252.4 | 252.6 | 252.3 | 252.3 |
| Flight distance (yard) | 234 | 233 | 234 | 232 | 232 |
| Spin amount (rpm) | 8490 | 8530 | 8360 | 8630 | 8560 |
| Cut resistance | ◯ | ◯ | ◯ | ◯ | ◯ |
| Durability (index) | 170 | 170 | 165 | 185 | 175 |
| Shot feel and controllability | ◯ | ◯ | ◯ | ◯ | ◯ |

TABLE 10

| | Example No. | | | | |
|---|---|---|---|---|---|
| | 18 | 19 | 20 | 21 | 22 |
| Center Cover | Liquid | Liquid | Liquid | Liquid | Liquid |
| Kind | F | G | H | I | J |
| Flexural modulus (MPa) | 220 | 240 | 80 | 275 | 130 |
| Shore D-scale hardness | 56 | 57 | 51 | 58 | 50 |

TABLE 10-continued

| | Example No. | | | | |
|---|---|---|---|---|---|
| | 18 | 19 | 20 | 21 | 22 |
| Ball physical properties | | | | | |
| Weight (g) | 45.4 | 45.4 | 45.4 | 45.4 | 45.4 |
| Initial velocity (feet/second) | 252.8 | 252.9 | 252.3 | 253.1 | 252.2 |
| Flight distance (yard) | 235 | 235 | 233 | 236 | 232 |
| Spin amount (rpm) | 8440 | 8370 | 8530 | 8240 | 8560 |
| Cut resistance | ◯ | ◯ | ◯ | ◯ | ◯ |
| Durability (index) | 165 | 162 | 178 | 155 | 180 |
| Shot feel and controllability | ◯ | ◯ | ◯ | ◯ | ◯ |

TABLE 11

| | Comparative Example No. | | | |
|---|---|---|---|---|
| | 5 | 6 | 7 | 8 |
| Center Cover | Liquid | Liquid | Liquid | Liquid |
| Kind | K | L | M | N |
| Flexural modulus (MPa) | 340 | 200 | 150 | 80 |
| Shore D-scale hardness | 62 | 58 | 55 | 51 |
| Ball physical properties | | | | | 
| Weight (g) | 45.4 | 45.4 | 45.4 | 45.4 |
| Initial velocity (feet/second) | 252.7 | 251.0 | 250.7 | 248.0 |
| Flight distance (yard) | 235 | 226 | 225 | 219 |
| Spin amount | 6830 | 7550 | 7940 | 9540 |
| Cut resistance | ◯ | ◯ | ◯ | X |
| Durability (index) | 100 | 130 | 135 | 85 |
| Shot feel and controllability | X | X | Δ | Δ |

As is shown in Table 6 to Table 7 and Table 9 to Table 10, the golf balls of Examples 1 to 22 showed good shot feel and controllability, suitable large spin amount and good spin performance, irrespective of the solid center or liquid center. Besides, the golf balls attained the flight distance of 232 to 236 and showed almost the same flight distance as those of the golf balls of Comparative Examples 1 and 5 using only a high-rigid ionomer resin as a base resin. The cut resistance reached a sufficiently satisfactory level. The golf balls of Examples 1 to 22 were considerably superior in durability to the golf balls of Comparative Examples 1 and 5.

To the contrary, standard two-piece solid golf balls of Comparative Examples 1 and 5 using only a high-rigid ionomer resin as a base resin was superior in flight performance and cut resistance, as shown in Table 8 and Table 11, but was poor in shot feel and controllability. In addition, the golf balls of Comparative Examples 2 to 3 and Comparative Examples 6 to 7 using a high-rigid ionomer resin in combination with a three-dimensional copolymer soft ionomer resin and golf balls of Comparative Examples 4 and 8 using only the three-dimensional copolymer soft ionomer resin were poor in shot feel, controllability and durability to the golf balls of Examples 1 to 22, and were considerably poor in flight distance to the golf balls of Examples 1 to 22.

What is claimed is:

1. A solid golf ball comprising a thread wound core and a cover covering the core, wherein the cover is formed from a heated mixture of:

(A) an ionomer resin,
   (B) a thermoplastic elastomer having a carboxyl group, and
   (C) a block copolymer having a styrene-butadiene-styrene structure wherein some of the unsaturated bonds in the butadiene block are epoxidized, or a block copolymer having styrene-isoprene-styrene structure wherein some of the unsaturated bonds in the polyisoprene block are epoxidized, said cover having a flexural modulus of from 130 to 275 Mpa and a Shore D-scale hardness of from 40 to 60.

2. The golf ball according to claim 1, wherein the ionomer resin is obtained by neutralizing at least a portion of carboxyl groups in a copolymer of ethylene and acrylic or methacrylic acid with metal ion and/or obtained by neutralizing at least a portion of carboxyl groups in a terpolymer of ethylene, acrylic or methacrylic acid and an $\alpha,\beta$-unsaturated carboxylate with metal ion, which has an acid content of from 10 to 20% by weight, when its backbone is a copolymer of ethylene and acrylic or methacrylic acid, or has an acid content of from 5 to 20% by weight, when its backbone is a terpolymer of ethylene, acrylic or methacrylic acid and an $\alpha,\beta$-unsaturated carboxylate.

3. The golf ball according to claim 1, wherein the ionomer resin is obtained by neutralizing at least a portion of carboxyl groups in a copolymer of ethylene and acrylic or methacrylic acid with metal ion, which has a melt index of 3 to 7 and a flexural modulus of 200 to 400 MPa.

4. The golf ball according to claim 1, wherein the thermoplastic elastomer having a carboxyl group is a maleic anhydride-modified thermoplastic elastomer.

5. The golf ball according to claim 1, wherein the thermoplastic elastomer having a carboxyl group is a terpolymer of ethylene, an unsaturated carboxylate and an unsaturated carboxylic acid.

6. The golf ball according to claim 1, wherein the thread wound core is composed of a center and a thread rubber layer formed by winding a thread rubber around the center, and the center is a solid center and a diameter of the center is from 28 to 38 mm and a deformation amount of 0.5 to 2.5 mm, the deformation amount being determined by applying a weight of from an initial load of 10 Kg to a final load of 30 Kg on the solid center and measuring a change of the deformation of the solid center by mm.

7. The golf ball according to claim 1, wherein the thread wound core is composed of a center and a thread rubber layer formed by winding a thread rubber around the center, and the center is a liquid center and a diameter of the center is from 26 to 34 mm.

* * * * *